[54] DIFFUSION MEMBRANE UNITS WITH ADHERED SEMIPERMEABLE CAPILLARIES

[75] Inventors: Clinton V. Kopp, Barrington; Dilip Shah, Gurnee, both of Ill.

[73] Assignee: Baxter Travenol Laboratories, Inc., Deerfield, Ill.

[21] Appl. No.: 133,083

[22] Filed: Mar. 24, 1980

[51] Int. Cl.³ ............................................. B01D 31/00
[52] U.S. Cl. ............................... 210/321.4; 210/500.2; 422/48; 261/DIG. 28; 428/109; 428/114; 428/201
[58] Field of Search ............................. 55/158; 422/48; 210/321.1, 321.2, 321.3, 321.4, 321.5, 433.2, 456, 232, 323 T, 500.2; 261/DIG. 28; 128/DIG. 3; 428/109, 110, 111, 114, 201

[56] References Cited

U.S. PATENT DOCUMENTS

| | | | |
|---|---|---|---|
| 2,738,298 | 3/1956 | David et al. | 428/109 X |
| 2,792,324 | 5/1957 | Daley et al. | 154/83 |
| 3,277,959 | 10/1966 | Withers | 165/159 |
| 3,419,069 | 12/1968 | Baker et al. | 165/158 |
| 3,459,615 | 8/1969 | Eilerman | 156/181 |
| 3,567,028 | 3/1971 | Nose | 210/232 |
| 3,622,429 | 11/1971 | Kippan | 428/110 |
| 3,650,870 | 3/1972 | Dietzsch et al. | 156/264 |
| 3,704,223 | 11/1972 | Dietzsch et al. | 210/321.1 X |
| 3,778,369 | 12/1973 | Markley | 210/456 X |
| 3,802,987 | 4/1974 | Noll | 156/296 |
| 3,963,622 | 6/1976 | Baudet et al. | 210/321.2 |
| 3,976,576 | 8/1976 | Jacobsen et al. | 210/321.3 |
| 3,993,816 | 11/1976 | Baudet et al. | 210/321.1 X |
| 4,211,597 | 7/1980 | Lipps et al. | 156/245 |
| 4,220,535 | 9/1980 | Leonard | 210/456 X |
| 4,243,454 | 1/1981 | Rhodes | 156/162 |

Primary Examiner—Charles N. Hart
Assistant Examiner—David R. Sadowski
Attorney, Agent, or Firm—Garrettson Ellis; Paul C. Flattery

[57] ABSTRACT

A diffusion membrane unit comprising: in a first embodiment, a planar arrangement of parallel separate capillary membrane tubes and junction lines of adhesive material extending continuously across said parallel membrane tubes and continuously along the entire length of said arrangement; and in a second embodiment a plurality of planar single-layered arrays of parallel capillaries defining out of phase sinuous paths.

8 Claims, 11 Drawing Figures

FIG. 1
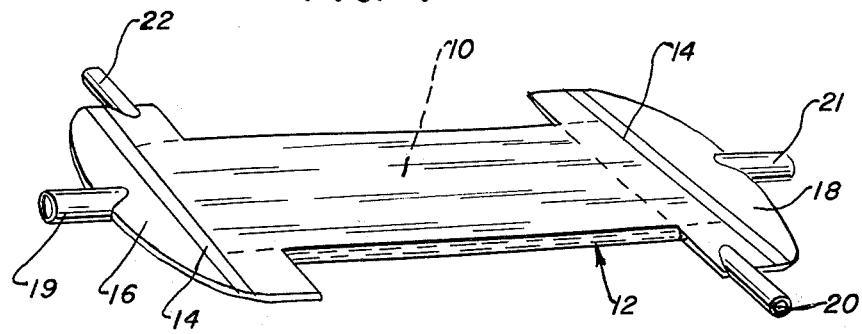
FIG. 2
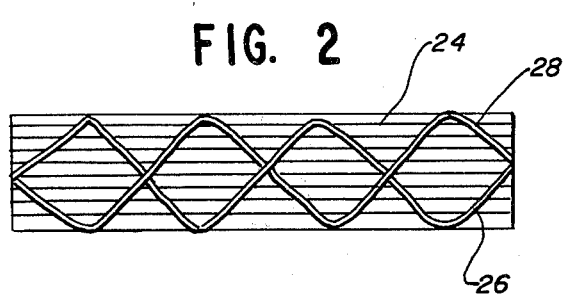
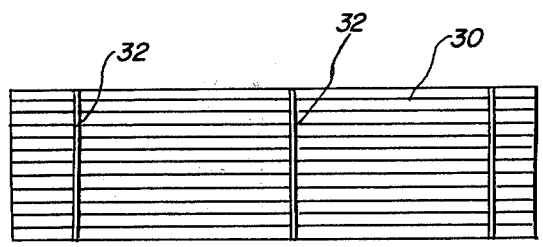
FIG. 3
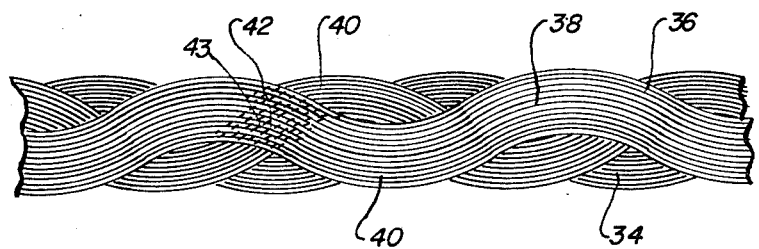
FIG. 4

FIG. 5
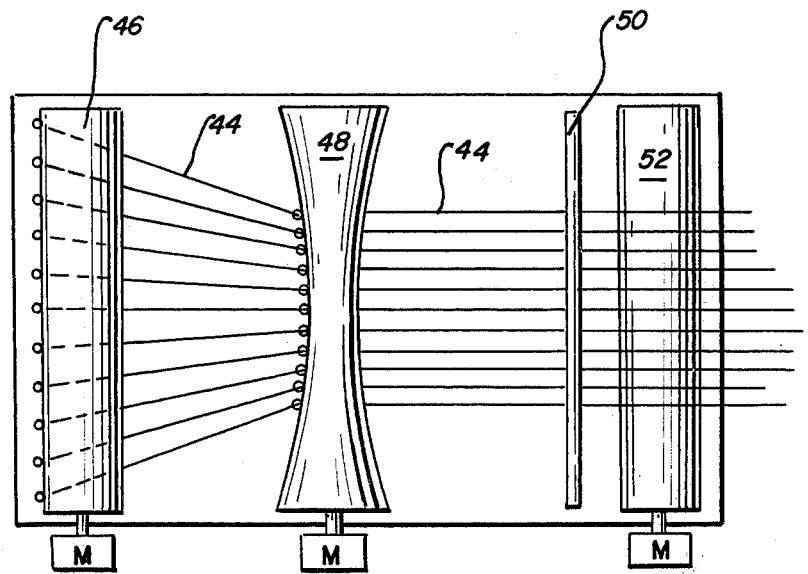
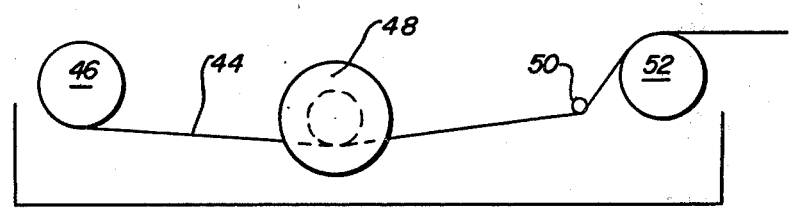
FIG. 5a
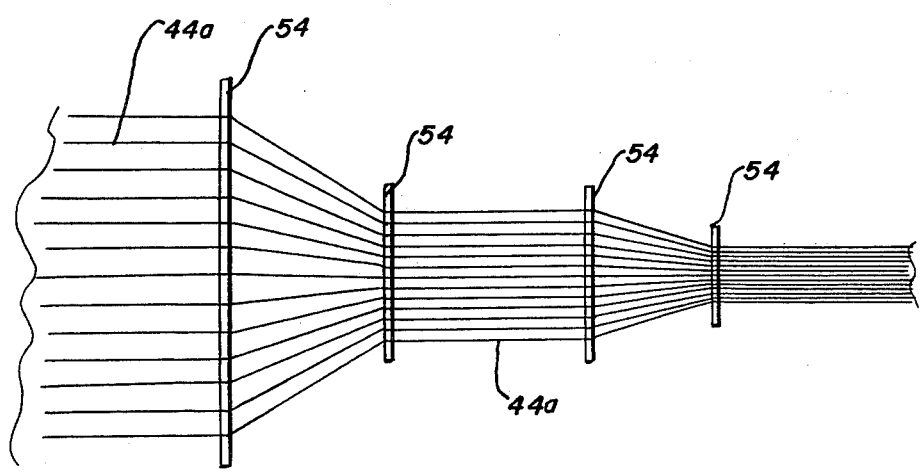
FIG. 6

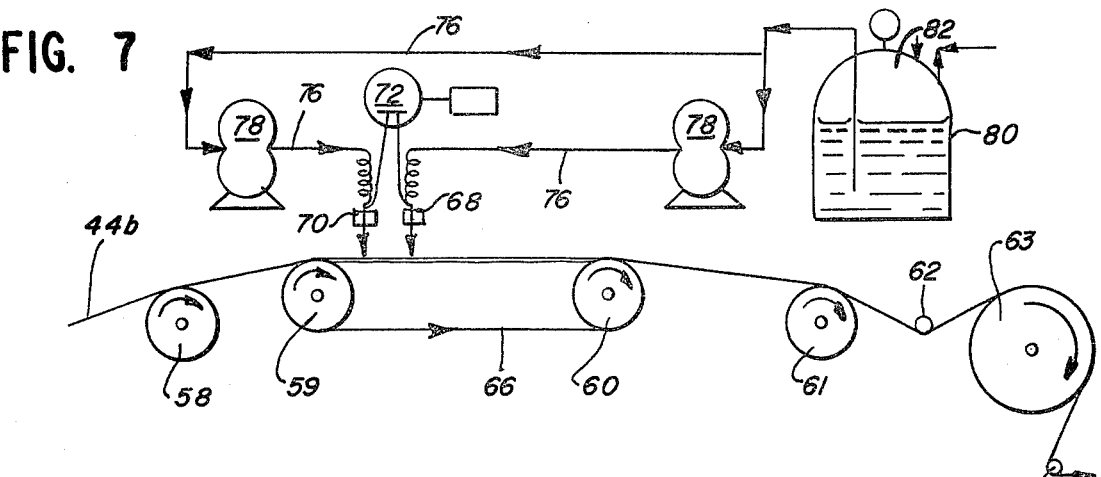
FIG. 7
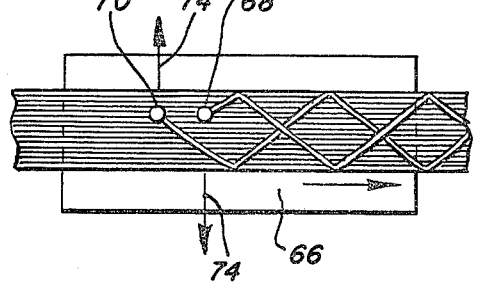
FIG. 8
FIG. 9
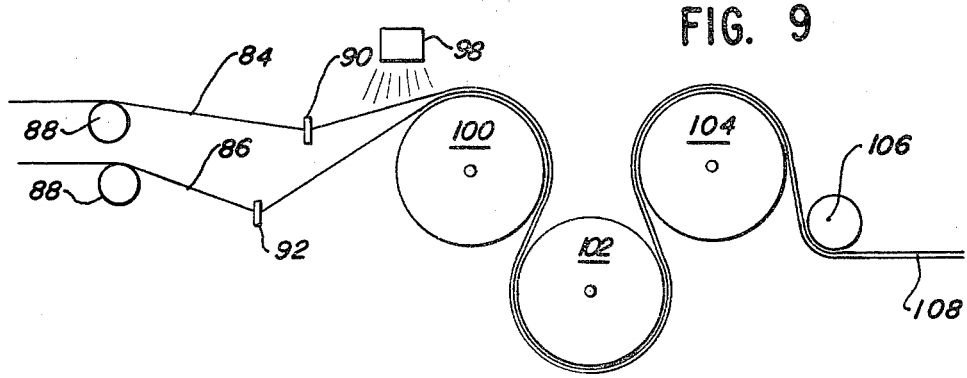
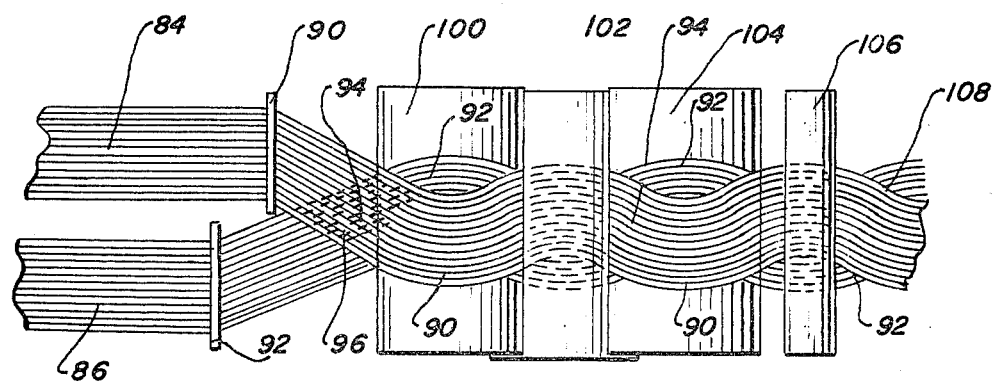
FIG. 10

DIFFUSION MEMBRANE UNITS WITH ADHERED SEMIPERMEABLE CAPILLARIES

BACKGROUND OF THE INVENTION

Capillary fiber dialyzers are currently being used in the dialysis of blood, and also show promise for use as oxygenators for blood and for other types of semipermeable diffusion apparatus. An example of such a capillary fiber dialyzer is the CF ® dialyzer sold by the Artificial Organs Division of Travenol Laboratories, Inc.

Other forms of capillary dialyzers involving a multiple tube flow path includes a Kohl U.S. Pat. No. 3,557,962, Riede U.S. Pat. No. 4,016,082, West German Patent Publication 2,824,898 of Cordis Dow Corporation, published on Dec. 21, 1978, and West German Pat. No. 2,622,684.

It has long been known to be desirable, particularly in blood dialysis as well as other diffusion techniques involving blood, for the blood flow paths to be of capillary nature, having a transverse dimension of, for example, 500 microns or less. These capillary flow paths for the blood or other material improve the dialysis efficiency of the device. Such capillary tubes are used, for example, in the commercial capillary fiber dialyzer mentioned above, as well as other commercial capillary fiber dialyzers.

It would be desirable to form joined arrays of capillary semi-permeable tubes, for example, to obtain an independent sheet of such joined capillary tubes. However, no efficient and effective way of manufacturing joined arrays of such tubes having a maximum transverse inner diameter of less than one millimeter has been available prior to this present invention.

In accordance with this invention, a diffusion membrane unit defining an internal flow path is provided in which joined tubes define individual flow channels through the diffusion membrane unit which may have a maximum transverse dimension of less than one millimeter or one thousand microns, with a minimum transverse dimension being as low as 70 or 100 microns, for greatly improved dialysis efficiency, or corresponding improvements in any other desired diffusion process.

DESCRIPTION OF THE INVENTION

In accordance with this invention, a method is provided for forming a diffusion membrane unit comprising a joined plurality of capillary membrane tubes, which comprises: forming a plurality of parallel, separate membrane tubes into a flat substantially two dimensional array, followed by applying junction lines of adhesive material across the parallel membrane tubes. Thereafter, the adhesive material is allowed to harden, with the result that the parallel capillary membrane tubes are joined together into an integral diffusion membrane unit for installation into a housing.

Preferably, the parallel, separate capillary membrane tubes are joined by the junction lines in spaced relation to each other for an improved exposure of tubular membrane area to the exterior. This, in turn, will improve the efficiency of the diffusion membrane unit.

It may be desirable for the hardened adhesive material to be essentially similar to the material comprising the membrane tubes. For example, cupraammonium cellulose material which may be used to form the tubes may also be used as the adhesive material to join the membrane tubes. Accordingly, some diffusion action can take place through the tube walls that are in contact with the adhesive material.

Alternatively, the capillary membrane tubes may be made of any semipermeable membrane material, for example, other forms of cellulose, polycarbonate resins, or the like for dialysis, or, for oxygenation of blood, polytetrafluoroethylene, silicone rubber, or preferably porous hydrophobic materials such as porous polypropylene or polytetrafluoroethylene, having pores on the order of 0.1 to 1 micron, by way of example. Conventional materials for membrane plasmapheresis or ultrafiltration may also be used if desired.

Any non-toxic, preferably semipermeable, binder may also be used in accordance with this invention. For example, water-compatible or water soluble materials such as carboxymethyl cellulose, polyvinyl alcohol, hydroxypropyl cellulose or starch may be used in conjunction with hydrophilic hemodialysis membrane tubing. Also binders soluble in organic solutions may be used with appropriate tubing materials. Alternatively, a heat seal technique may be used so that the junction lines of adhesive material across the parallel membrane tubes are produced by the very tubes themselves. Also hot-melt sealant binders such as poly(ethylene-vinyl acetate) may be applied, preferably after the fiber is dried.

Semipermeable dialysis type fibers made of a cellulose-based material, polycarbonate, or crosslinked polyvinyl alcohol, for example, may be made by any known process, for example, by a hot melt technique or a solution spinning technique, depending on the circumstances.

Preferably, the capillary membrane tubes may have a wall thickness of 3 to 50 microns and a bore diameter of 70 to 700 microns. Preferably, the bore diameter for capillary fibers used in hemodialysis may be $200\pm50$ microns. If the capillary membrane tube is intended for use for the oxygenation of blood, it may preferably have a bore diameter of $500\pm200$ microns.

For example, the junction lines of adhesive material may cross the plurality of capillary membrane tubes in an X-shaped or crossing wave pattern to extend essentially the entire length of the membrane unit. Parallel junction lines crossing the capillary membrane tubes may also be used as desired with a plurality of such junction lines being positioned between the ends. Other patterns using one or more junction lines may be used as well.

As an advantage of this invention, the supported integral diffusion membrane unit may comprise capillary membrane tubes having thinner walls, because the tubes are supported as a membrane unit, and not just as separate fibers, which provides them a measure of protection.

Alternatively, a plurality of single layers of parallel, separate, capillary membrane tubes may be brought together in facing relationship, with the layers of parallel membrane tubes defining sinuous paths. The specific sinuous paths of each layer of parallel fibers may be different, with the result that portions of the adjacent layers of fibers are out of contact with each other, and other portions of each layer of parallel fibers are in contact with the adjacent layers. Accordingly, the individual fibers of each layer may be in crossing, contacting relationship with the fibers of adjacent layers. Adhesive means are provided for adhering the crossing fibers together, which adhesive means may be applied by a solution spray, an applicator roller, or the like.

As a manufacturing technique, the single fibers may be conventionally extruded and then brought into their flat, substantially two-dimensional array by a roller system containing one or more concave rollers, or by a system of combs to guide the fibers into the desired closed, parallel, substantially two-dimensional array.

Preferably, the flat, substantially two-dimensional arrays of fibers contemplated in this invention comprise no more than ten layers of parallel, separate, capillary membrane tubes. Since the capillary membrane tubes may have a bore diameter on the order of 200 microns, for example, and a wall thickness on the order of 20 microns, the individual fibers may have an outer diameter on the order of 240 microns. Thus, the flat, substantially two-dimensional array containing ten layers of such fibers still will only have a thickness of about 2400 microns, while the same array may have a width of three or four centimeters, by way of example. Such a structure thus retains its substantially two-dimensional characteristic. Preferably, no more than five separate layers of capillary membrane tubes are utilized in this invention.

After the array of fibers is secured in a housing and supported thereby, if the adhesive material is made from a soluble substance, the housing interior may be washed with the appropriate solvent to dissolve the adhesive material and remove it from the housing. This tends to provide improved diffusion characteristics to the diffusion membrane unit of this invention. Preferably a water soluble adhesive material is used, the solvent being water.

FIG. 1 is a perspective view of a diffusion membrane member, comprising a joined, flat, substantially two-dimensional array of capillary membrane tubes, positioned in a housing for use as a diffusion device, for example, a dialyzer.

FIG. 2 is a plan view showing a flat array of fibers carrying junction lines of adhesive material in a wave-shaped, crossing multiple X-pattern.

FIG. 3 is a plan view of a flat, substantially two-dimensional array of fibers in which the lines of adhesive material cross the array in transverse, straight lines.

FIG. 4 is a plan view of a multi-layered, flat, substantially two-dimensional array in which the individual layers of parallel, separate capillary membrane tubes occupy sinuous paths.

FIG. 5 is a schematic plan view of a system for advancing the fibers to bring them into closely-spaced, substantially two-dimensional array.

FIG. 5a is an elevational view of the arrangement of FIG. 5.

FIG. 6 is a schematic plan view of alternative apparatus for bringing an array of fibers into closely-spaced, substantially two-dimensional relationship.

FIG. 7 is a schematic elevational view of apparatus for applying junction lines to a continuous band of membrane tubes in substantially two-dimensional array, to produce the pattern of junction lines illustrated in FIG. 2.

FIG. 8 is a schematic, plan view of the array of parallel fibers of FIG. 7 showing the motion of the applicator apparatus.

FIG. 9 is a schematic, elevational view of apparatus adapted to form the multi-layered array of parallel tubes in which the individual layers of parallel tubes define sinuous paths.

FIG. 10 is a schematic plan view showing the action of the apparatus of FIG. 9.

Referring to FIG. 1, a composite diffusion membrane device comprising a flat, substantially two-dimensional array of capillary fibers 10, enclosed in a rectangular housing, is disclosed. If desired, a plurality of flat arrays 10 may be stacked together and placed in a housing 12, to provide a composite diffusion core of greater thickness than the substantially two-dimensional structure made in accordance with this invention.

Diffusion members 10 may be potted at their ends 14 in a manner analogous to current technology for hollow fiber dialyzers, to define sealed manifold chambers 16, 18, respectively defining an inlet 19 and an outlet 21 which communicate only with the bores of the fibers in diffusion member 10, for the purpose of defining a first flow path through the device within the bores of the capillary tubes.

A second flow path through the diffusion device along the exteriors of the capillary tubes of the diffusion device 10 may then be defined by a second fluid inlet 20 and outlet 22, positioned in the side of housing 12 in a manner which is also analogous to conventional fiber dialyzer technology. The rectangular shape of housing 12 and diffusion member or members 10 provides a substantially simplified and efficient diffusion device which is easy to manufacture. Examples of members 10 are disclosed in FIGS. 2-4.

Referring to FIG. 2, a substantially two-dimensional array of a single layer of parallel capillary fibers 24 is shown. In accordance with this invention, junction lines of adhesive material 26, 28 have been applied across the width of the array of capillary fibers or tubes, to hold the array of tubes into an integral array for ease of handling and for retention of the individual tubes in the desired configuration. The pattern of application of the junction lines of adhesive material is, as shown, wave-shaped for each of lines 26, 28, with the respective shapes being of opposite phase so that they form a crossing, multiple X-pattern, which preferably extends from end to end along the entire length of the array of fibers 24. Alternatively, a single wavy line may be used as the junction lines of adhesive material.

Preferably, the array of fibers 24 is positioned closely together but in spaced relation, for example, from 0.01 to 0.05 inch apart, for improved diffusion efficiency in operation. This spacing is maintained by junction lines 26, 28 of adhesive material, with the resulting structure being a composite, strong member which retains individual fibers in their proper positions.

Preferably, the capillary tubes in the array of tubes 24 may be made of a cellulose type material, for example, cuprammonium cellulose. The junction lines of adhesive 26, 28 may then also be made of the same cuprammonium cellulose material, or another cellulose-based material, which is applied in liquid form to the array of tubes, and caused to solidify by a coagulation step appropriate to cuprammonium cellulose, or by evaporation of a solvent, or the like. However, other adhesive or potting materials may be used for junction lines 26, 28 as desired.

Referring to FIG. 3, another flat, substantially two-dimensional single-layered array of capillary membrane tubes 30 is shown, with the junction lines 32 in this instance crossing the array of membrane tubes 30 in transverse, straight lines. It should be noted that a plurality of junction lines 32 are positioned intermediate of the ends of array 30, to provide intermediate stabilization and support of the diffusion member array 30. As before, both the tubes of array 30 and the junction lines 32 may comprise cupraammonium cellulose. However, in addition, as in the case of junction lines 26, 28, junction lines 32 may comprise other materials such as various forms of glue, potting compound or the like.

In both the instances of FIGS. 2 and 3, the capillary membrane tube arrays are typically made in a continuous length, and are then cut to the desired length. It is preferable in the instance of FIG. 3 to cut through the middle of some of junction lines 32 to separate the lengths of membrane tubing into separate members for installing in a housing. However, it is preferably still for one or more lines 32 to be located intermediate the ends of the cut sections, for added stabilization of the composite tubular array.

Referring to FIG. 4, a multi-layered flat, substantially two-dimensional array of capillary membrane tubes is disclosed. A plurality of single layers 34, 36, 38 of parallel, membrane tubes are held together in facing relationship with layers 34, 36, 38 each defining sinuous paths. As shown, the specific sinuous paths of each layer of parallel fibers are different (or out of phase), so that portions 40 of the adjacent layers (for example, layers 36 and 38) are out of contact with each other. At the same time, other portions 42 of, for example, layers 36, 38 are in contact with each other as adjacent layers, so that the individual fibers of each layer are in crossing, contacting relationship with fibers of adjacent layers, at points 43. The fibers are adhesively adhered together at the fiber crossing points 43 of adjacent layers by use, for example, of an assembly technique described below, with points 43 arranged together to define adhesive junction lines.

This resulting composite array of capillary membrane tubes provides large diffusion wall surface area in an essentially two-dimensional array, with low masking of the respective fibers by each other because they are in crossing relationship to adjacent fibers, and with lengthened flow paths due to the sinuous nature of the fibers.

Referring to FIGS. 5 and 5a, apparatus is shown for automatically bringing the capillary membrane tubes together into closely-spaced, flat, substantially two-dimensional array.

The capillary tubes 44 may be fed to the apparatus shown in FIGS. 5 and 5a from feed spools or the like, to pass across guide roller 46 and to change the angle of travel of capillary tubes 44 in the process. From there, tubes 44 pass across concave roller 48, which, as shown, has the effect of impelling them more closely together into tangent or slightly spaced relation.

Following this, the array of tubes 44 is drawn upwardly across control bar 50, and from there they are flattened out into their desired planar structure by guide roller 52. From there, the array of capillary tubes 44 passes onwardly to apparatus for applying the desired junction lines of adhesive material across the parallel membrane tubes 44, followed by a cutting step for cutting the continuous lengths of joined membrane tubes into diffusion membrane sections of desired legnth.

Referring to FIG. 6, a similar array of capillary membrane tubes 44a can be brought into closely space, two-dimensional array by being passed through a series of comb members 54, to gradually step down the lateral spacing of the capillary membrane tubes 44a as desired, while retaining the substantially two-dimensional characteristic thereof, by progressively narrowing the spacing of the slots between the comb teeth.

Following this step, as in the processing step illustrated in FIG. 5, the array of membrane tubes 44a may be conveyed through apparatus for applying the junction lines of adhesive material, followed by a cutting step to form the diffusion membrane sections.

Referring to FIGS. 7 and 8, there is shown apparatus for applying junction lines of adhesive material across the parallel membrane tubes, and specifically in a pattern similar to that shown in FIG. 2. The plurality of membrane tubes 44b may be unwound off of spools and fed across rollers 58 through 64, with rollers 58 and 61 being driven. A continuous belt 66 is threaded around rollers 59 and 60, to support the membrane tubes 44b as the junction lines of adhesive material are applied.

Roller 63 may be a heated roller to help in curing of the adhesive material, or alternatively hot air may be blown over the joined membrane tubes 44b for curing purposes, if desired, or any other curing technique may be utilized as a substitute for roller 63.

Roller bar 64 then may guide the joined membrane tubes 44b toward a cutting station, to cut the material into desired lengths.

Adhesive stripe applicator members 68, 70 are operated by a simple mechanical guiding mechanism 72 of conventional design which reciprocates applicator members 68, 70 back and forth across the width of the moving belt of membrane tubes 44b. Moving in the direction of arrows 74 in the specific instance shown, stripe applicator members 68, 70 can move back and forth across the width of the belt of membrane tubes 44b in alternating manner. Accordingly, since belt of capillary tubes 44b is moving, the junction lines of adhesive material 26, 28 which are laid down by applicators 68, 70 forms the out-of-phase, sinuously patterned crossing junction lines as shown in FIG. 8 and also FIG. 2.

The adhesive material is applied to stripe applicator units 68, 70 through conduits 76, being metered through the applicator unit 68, 70 by metering pumps 78, which may be gear pumps. Conduits 76 lead to a tank 80, containing the liquid adhesive material which may be pressurized with a supply of pressurized nitrogen gas 82 or by any other convenient means for pressurizing the adhesive material, for flow through the conduits 76 and metering pumps 78, for application as stripes 26, 28 to the array of membrane tubes 44b.

Referring to FIGS. 9 and 10, apparatus is shown for the manufacture of capillary tube membrane units of a design similar to that of FIG. 4. In FIGS. 9 and 10, a two-layered membrane unit is under manufacture, but obvious modifications of the apparatus permit the manufacture of three-layer and higher multiple layer units.

A pair of flat, substantially two-dimensional, single layered arrays of capillary tubes 84, 86 may be formed from spools, and the individual capillary tubes brought into close proximity with each other in a manner previously described. After the arrays 84, 86 pass across guide rollers 88, they pass through comb-like members 90, 82 which, in turn, as shown by FIG. 10, reciprocate laterally back and forth in a direction parallel to the planes of the flat arrays 84, 86 to form a sinuous pattern in the arrays. The differing arrays 84, 86 define differing sinuous paths as shown in FIG. 10, so that portions of each array are out of contact with the adjoining arrays, for example, portions 90 of array 84 and 92 of array 86. Other portions of the arrays, for example portions 94 of both of them, are in facing, overlying relation with the adjacent array. As can be seen, the respective membrane tubes of each array, 84, 86 cross at an acute angle to the membrane tubes of the adjacent array, with the tube crossing points 96 being shown in FIG. 10.

Adhesive material is appied to the fiber arrays, for example, by a spray apparatus 98 for applying a solution of the particular adhesive used, in a volatile solvent, to the crossing arrays 84, 86, preferably just before they are brought into contact with each other as shown in FIG. 10. Accordingly, the individual capillary tubes of arrays 84, 86 are joined together by the adhesive at their crossing points 96.

Following this, the joined units of arrays 94, 96 are passed across roller members 100, 102 and 104, one or more of which may be heated rollers to cure the adhesive. Alternatively, or additionally, a hot air unit may be used to assist in the drying or curing process. Following this, guide roller 106 is provided to direct the newly-formed composite of capillary tubings 108 to a cutting station.

The resulting unitary structures may be inserted into a housing similar to that shown in FIG. 1, to define a first flow path within the bores of the tubes of arrays 84, 86, and a second flow path along the exterior of the tubes.

It can be seen that the assembly method of this invention permits the assembly of capillary membrane tubes having very small maximum transverse dimensions, preferably less than 1000 microns, with minimum transverse dimensions being as low as about 70 or 100 microns. This type of capillary membrane tube provides greatly improved diffusion efficiency, for example, as a dialysis membrane. Accordingly, the known advantages of these capillary membrane fibers, coupled with the advantages of a diffusion membrane which is unitary and readily handlable during the manufacturing process without falling apart into its component capillary tubes, are provided. Furthermore, crossing fiber configurations of the diffusion membrane units in accordance with this invention provide improved efficiency of operation in terms, for example, of dialysance, due to the crossing relationship of the membrane tubings.

In the instance where a water soluble adhesive material is used to make the junction lines of the diffusion membrane devices, such as polyvinyl alcohol or starch, and after the diffusion membrane devices have been installed in housings 12, water may be inserted through one of ports 20 or 22 to bathe the exterior surface of the diffusion membrane device, thus washing away the adhesive material. This, of course, exposes more surface area of the tubular membranes to dialysis solution, for example, during operation of the device so that the diffusion efficiency of the device will be increased. At the same time since the tubes are secured at potted ends 14, they will remain in the generally desired configuration in which they were sealed by the adhesive material.

Highly hydrophilic materials, very compatible with water but technically insoluble because of their high molecular weight, such as carboxymethyl cellulose, may also be used as the adhesive material which may be washed away by water after installation in housings 12 in a manner similar to more soluble adhesive materials.

The above has been offered for illustrative purposes only, and is not intended to limit the invention of this application, which is as defined in the claims below.

That which is claimed is:

1. A diffusion membrane device comprising a joined plurality of semipermeable capillary membrane tubes comprising, a plurality of planar, single-layered arrays of substantially parallel capillary membrane tubes, said parallel tubes of each of said plurality of single-layered arrays lying in facing contact with at least one adjacent, single-layered, planar array, said plurality of planar arrays defining out of phase sinuous paths, portions of each single-layered array being out of contact with adjoining single-layered arrays, and other portions of each single-layered array being in facing, overlying relation with adjacent single-layered arrays, with the respective capillary membrane tubes of each said single-layered array crossing at an acute angle the tubes of the adjacent single-layered arrays, the crossing tubes of the respective single-layered arrays being adhered to each other, whereby said diffusion membrane device defines a single, unitary structure.

2. The diffusion membrane device of claim 1 which is inserted into a housing, and connected to manifold members of said housing to define a first flow path within the bores of said tubes and a second flow path along the exteriors of said tubes.

3. The diffusion membrane device of claim 1 which comprises two flat, sinuous arrays.

4. A diffusion membrane device which comprises a joined plurality of semipermeable capillary membrane tubes defining hollow bores and a length defined axially along said tubes, occupying a flat, substantially planar array, junction line means of cured adhesive material extending across said flat array to adhere the membrane tubes together in a unitary structure, a housing enclosing said flat array with manifold port means at opposed ends of the tubes defining a first, separate flow path within bores of said tubes, and a second, separate flow path along the exteriors of said tubes, said junction line means extending continuously along substantially the entire length of said capillary membrane tubes and extending substantially the entire distance between said manifold port means at said opposed ends.

5. The diffusion membrane device of claim 4 in which said cured adhesive material is essentially similar to the material comprising said membrane tubes.

6. The diffusion membrane device of claim 4 in which said membrane tubes and adhesive material are made of a semipermeable, cellulose-based material.

7. The diffusion membrane of claim 4 in which said junction line means crosses back and forth across the entire width of said plurality of capillary membrane tubes in a wave-shaped pattern.

8. The diffusion membrane of claim 7 in which a pair of junction line means of cured adhesive material extend along said plurality of capillary membrane tubes in an X-shaped pattern.

* * * * *